(12) United States Patent
Sumi

(10) Patent No.: US 8,811,770 B2
(45) Date of Patent: Aug. 19, 2014

(54) IMAGE PROCESSING APPARATUS, IMAGE PROCESSING METHOD, AND STORAGE MEDIUM

(75) Inventor: Naoki Sumi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 48 days.

(21) Appl. No.: 13/553,609

(22) Filed: Jul. 19, 2012

(65) Prior Publication Data

US 2013/0022291 A1 Jan. 24, 2013

(30) Foreign Application Priority Data

Jul. 23, 2011 (JP) ................................. 2011-161435

(51) Int. Cl.
*G06K 9/36* (2006.01)

(52) U.S. Cl.
USPC ............................ 382/284; 382/173; 382/190

(58) Field of Classification Search
USPC .......... 382/284, 240, 173, 164; 345/619, 629, 345/630; 348/220.1, 231.1, 239, E5.037; 356/237.1, 240.1; 375/E7.42
See application file for complete search history.

(56) References Cited

U.S. PATENT DOCUMENTS 7,623,733 B2 * 11/2009 Hirosawa ...................... 382/284
8,405,734 B2 * 3/2013 Misawa ...................... 348/220.1

FOREIGN PATENT DOCUMENTS

JP 4415198 B2 2/2010

* cited by examiner

*Primary Examiner* — Anh Do
(74) *Attorney, Agent, or Firm* — Canon U.S.A., Inc., IP Division

(57) ABSTRACT

An image processing apparatus specifies, based on a reference image out of a plurality of images and a plurality of comparative images out of the plurality of images, a difference region, in each of the plurality of comparative images, including an object subjected to combination corresponding to a difference from a reference image, determines, based on a plurality of difference regions specified in the plurality of comparative images, an object region corresponding to an object included in the reference image, and combines, based on the determined object region in the reference image and the plurality of difference regions in the plurality of comparative images, with the reference image, the objects subjected to combination included in the plurality of difference regions so that an object corresponding to the object region is included in the reference image with which the plurality of difference regions are combined.

14 Claims, 12 Drawing Sheets

501

FIG.9
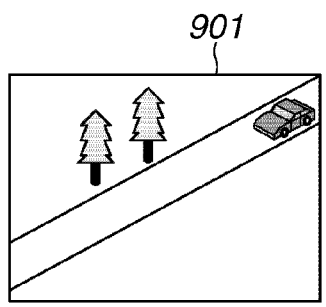
901
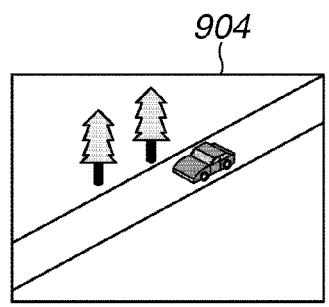
904
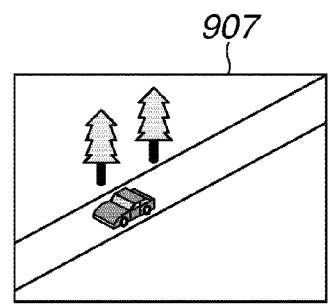
907
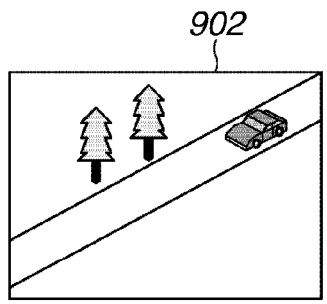
902
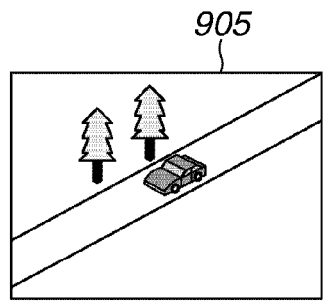
905
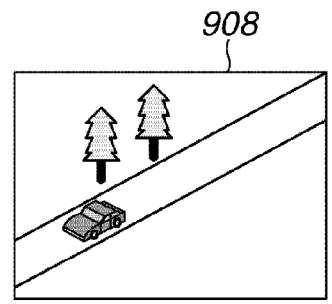
908
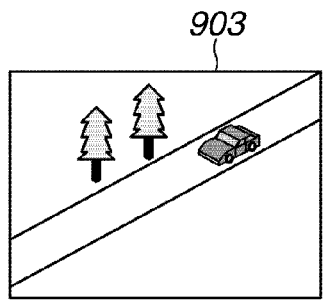
903
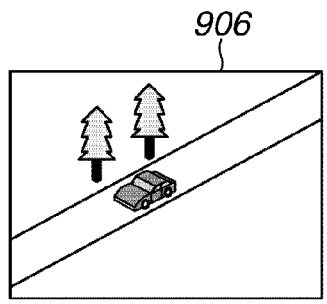
906
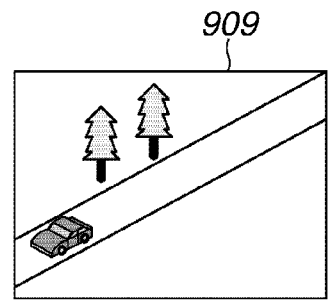
909

1209

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus for combining objects included in a plurality of images into one image, an image processing method, and a storage medium.

2. Description of the Related Art

In recent years, a technique for combining continuously-shot moving object images captured by using a digital still camera into one image has been used. A plurality of temporally continuous images can be acquired from moving images or continuous shooting by using a camera. Combining moving object portions of the plurality of images enables motion analysis of a moving object and providing special effects on images.

Japanese Patent No. 4415198 discusses an image combining technique for combining a plurality of images (frames). The technique discussed in Japanese Patent No. 4415198 specifies a background portion (a portion other than moving object portions) in a plurality of frames, generates a background image not including the moving object portions, and combines the moving object portions of each frame with the generated background image.

The above-described conventional technique extracts moving object portions in a plurality of images subjected to combination, generates a background image not including the moving object portions, and combines the moving object portions with the generated background image. Such processing for generating a background image has issues with a large processing load.

SUMMARY OF THE INVENTION

An aspect of the present invention is directed to an image processing apparatus capable of suitably combining objects included in a plurality of images into one image through simple processing, an image processing method, and a storage medium.

According to an aspect of the present invention, an image processing apparatus for combining objects included in a plurality of images into one image includes: a specification unit configured to, based on a reference image out of a plurality of images and a plurality of comparative images out of the plurality of images, specify a difference region, in each of the plurality of comparative images, including an object subjected to combination corresponding to a difference from the reference image; a determination unit configured to, based on a plurality of difference regions specified in the plurality of comparative images by the specification unit, determine an object region corresponding to an object included in the reference image; and a combination unit configured to, based on the object region in the reference image determined by the determination unit and the plurality of difference regions in the plurality of comparative images, combine, with the reference image, the objects subjected to combination included in the plurality of difference regions so that an object corresponding to the object region is included in the reference image with which the plurality of difference regions are combined.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates a plurality of images subjected to combination.

DESCRIPTION OF THE EMBODIMENTS

Various exemplary embodiments, features, and aspects of the invention will be described in detail below with reference to the drawings.

Figure 1:
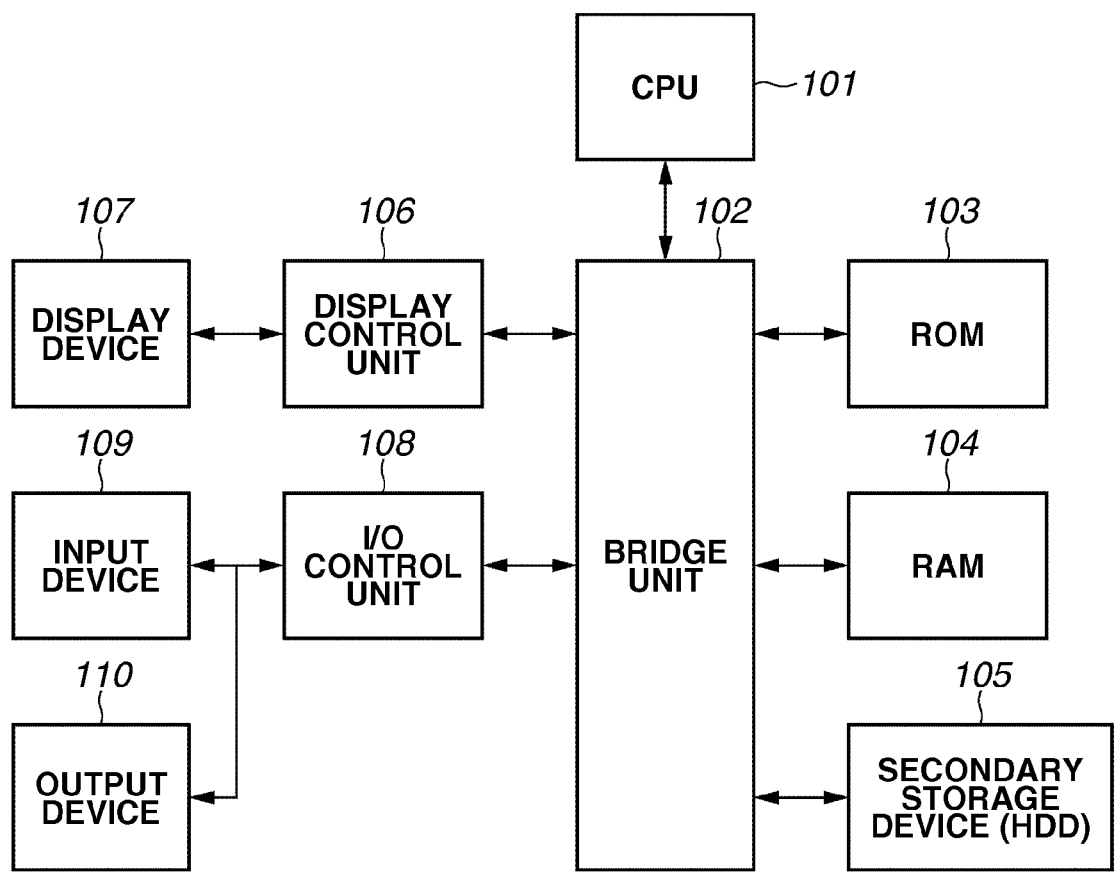
FIG. 1 is a block diagram illustrating a configuration of an image processing apparatus.

FIG. 1 is a block diagram illustrating a configuration of an image processing apparatus. Description will be made on the premise that a personal computer (PC) is used as the image processing apparatus.

A central processing unit (CPU) 101 controls other function blocks and devices. A bridge unit 102 provides a function of controlling data exchange between the CPU 101 and other function blocks.

A read-only memory (ROM) 103 is a read-only non-volatile memory in which a program called a basic input/output system (BIOS) is stored. The BIOS, a program executed first when the image processing apparatus is activated, controls basic input/output functions of peripheral devices such as a secondary storage device 105, a display device 107, an input device 109, and an output device 110.

A random access memory (RAM) 104 provides a high-speed readable/rewritable storage area.

The secondary storage device 105 is a hard disk drive (HDD) providing a mass storage area. When the BIOS is executed, an operating system (OS) stored in the HDD is executed. The OS provides basic functions usable by all applications, management of applications, and basic graphical user interfaces (GUIs). By combining GUIs provided by the OS, each application can provide a user interface (UI) for implementing application-specific functions.

The above-described OS, executable application programs, and data used for working are stored in the ROM 103 or the secondary storage device 105 as required. Further, an image processing application for implementing the present exemplary embodiment is stored in the ROM 103 or the secondary storage device 105, and provided as an application which is activated by a user operation. The processing described below is implemented when the CPU 101 executes the OS and other programs (such as the image processing application) stored in the ROM 103 and the secondary storage device 105, by using the RAM 104 as a work memory.

The display control unit 106 performs control for displaying various images on the display device 107. Images displayed on the display device 107 include, for example, images stored in the secondary storage device 105 and GUI images indicating results of user operations applied to the OS and applications. The display device 107 may be a liquid crystal display (LCD) or cathode-ray tube (CRT) display.

An I/O control unit 108 provides interfaces to a plurality of input devices 109 and output devices 110. Typical interfaces include the universal serial bus (USB) and personal system/2 (PS/2).

The input device 109 is an operation device such as a keyboard and mouse. The I/O control unit 108 inputs a user instruction to the image processing apparatus via the input device 109.

The I/O control unit 108 connects various output devices 110 to the bridge unit 102. When the I/O control unit 108 outputs print data to the output device 110, for example, a printer, images corresponding to the print data can be printed.

Storage devices such as a digital camera, a USB memory, a CompactFlash (CF) memory, a secure digital (SD) memory card, etc., can be connected to the image processing apparatus. The I/O control unit 108 enables transmitting image data to a digital camera and memory and acquiring data therefrom.

In the present exemplary embodiment, a plurality of frames subjected to combination is extracted from moving images composed of a plurality of frames, and the plurality of the extracted frames is combined. The moving image data is supplied from the secondary storage device 105, or a USB memory, a CF memory, an SD memory card, etc., connected to the image processing apparatus.

In the present exemplary embodiment, assuming that one out of a plurality of images subjected to combination as a main image or reference image, a difference between the main image and each of comparative images (images other than the main image) out of the plurality of images subjected to combination is acquired. Then, an image of a difference region (a region having a difference from the main image) in each of the comparative images is combined with the main image. If there exists a moving object in the plurality of images subjected to combination, the moving object in each of the comparative images is combined with the main image. Therefore, an object existing at a different position from an object position in the main image will be combined with the main image.

Figure 3:
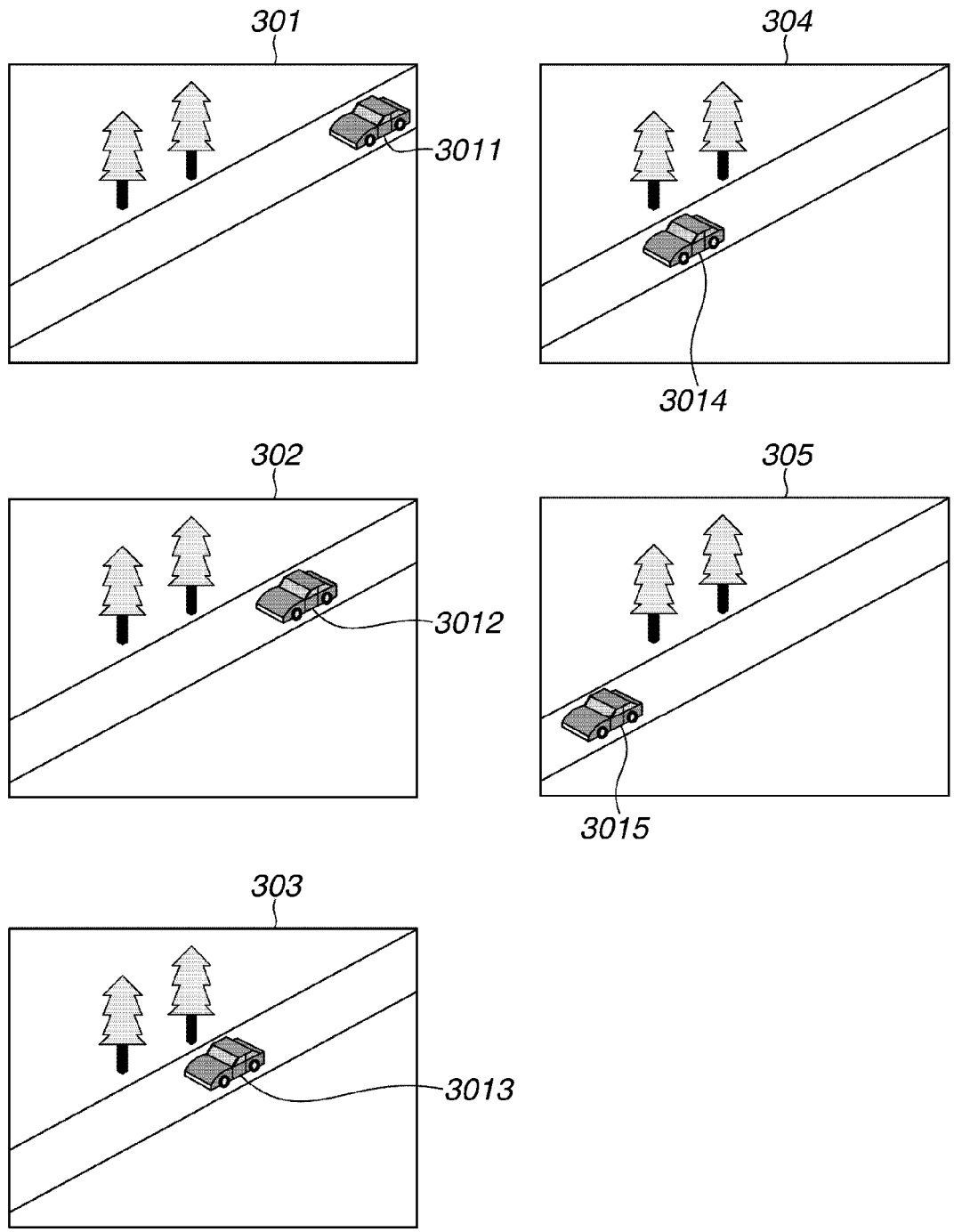
FIG. 3 illustrates a plurality of images subjected to combination.

This combination processing will be described below with reference to FIG. 3. FIG. 3 illustrates a plurality of images subjected to combination. Images 301 to 305 are still images extracted from a moving image of a car moving from the top right to the bottom left of the image. Referring to FIG. 3, the image 301 is the temporally first image, and the image 305 is the temporally last image.

Of the images 301 to 305, the temporally last image is assumed to be a main image, and other images are assumed to be comparative images (hereinafter referred to as comparative images). Specifically, FIG. 3 illustrates a main image 305 and comparative images 301 to 304. Although, in this case, the temporally last image is the main image, other images may be the main image. For example, the temporally first image, the temporally centermost image, a user-specified image, etc., can be recognized as the main image.

The present exemplary embodiment acquires a difference between the main image 305 and each of the comparative images 301 to 304, and combines the main image 305 and an image of a difference region (a region having a difference from the main image 305) in each of the comparative images 301 to 304. Since each of objects 3011 to 3014 in the comparative images 301 to 304, respectively, exists at a different position from an object 3015 in the main image 305, each of the objects 3011 and 3014 is identified as a difference region for the main image 305 (a region having a difference from the main image 305). Then, the objects 3011 to 3014 are combined with the main image 305 as images of difference regions in the comparative images 301 to 304.

Figure 5:
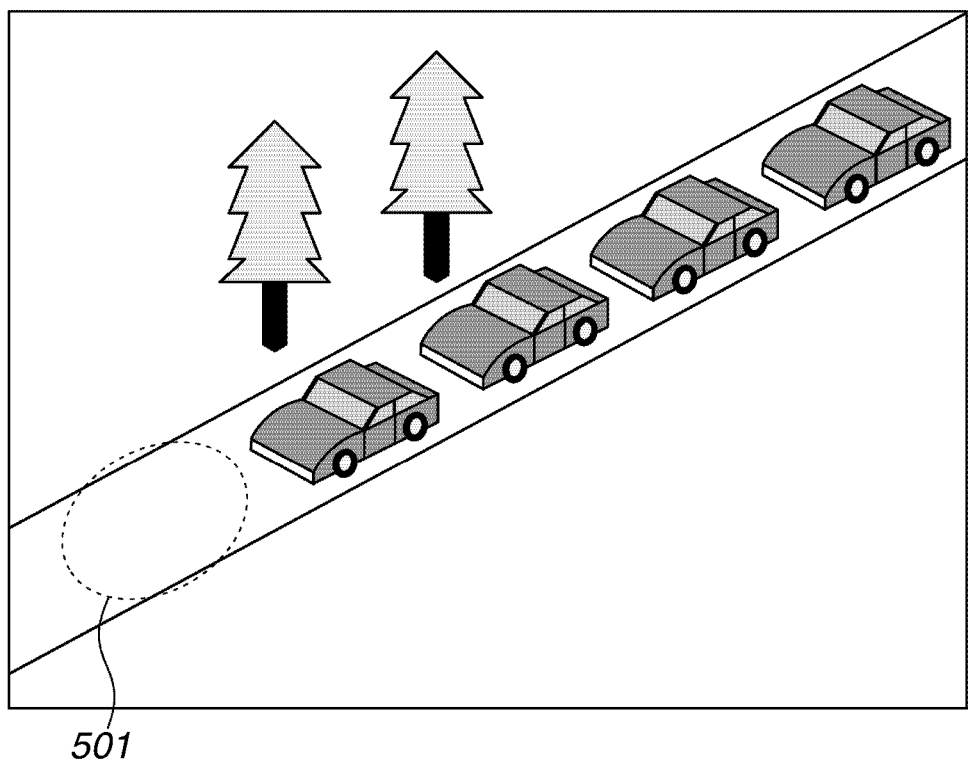
FIG. 5 illustrates a resultant combined image produced by combining the main image and images of difference regions in the comparative images.

FIG. 5 illustrates a resultant combined image produced by combining the main image 305 and images of difference regions in the comparative images 301 to 304. As illustrated in FIG. 5, the objects 3011 to 3014 are combined with the main image 305. The user who sees this combined image can make sure that the car is moving as the objects 3011 to 3014.

Referring to FIG. 5, however, the object 3015, which originally exists in the main image 305, may disappear. This phenomenon is caused by combining the main image 305 and images of difference regions (regions having a difference from the main image 305) in the comparative images 301 to 304, as described above. Specifically, although the car (object 3015) exists at the bottom left of the image in the main image 305, the car does not exist at that position in the comparative images 301 to 304. Then, a region in each of the comparative images 301 to 304 corresponding to the region of the object 3015 in the main image 305 is also identified as a difference region. Therefore, the images of the bottom left regions in the comparative images 301 to 304 are also combined with the main image 305. In this case, since the image of the bottom left region in each of the comparative images 301 to 304 is not a car but a road, combining the images of the bottom left regions and the main image 305 will overwrite the object 3015 in the main image 305 with the road image. Thus, the object 3015 disappears in the combined image illustrated in FIG. 5.

Figure 4:
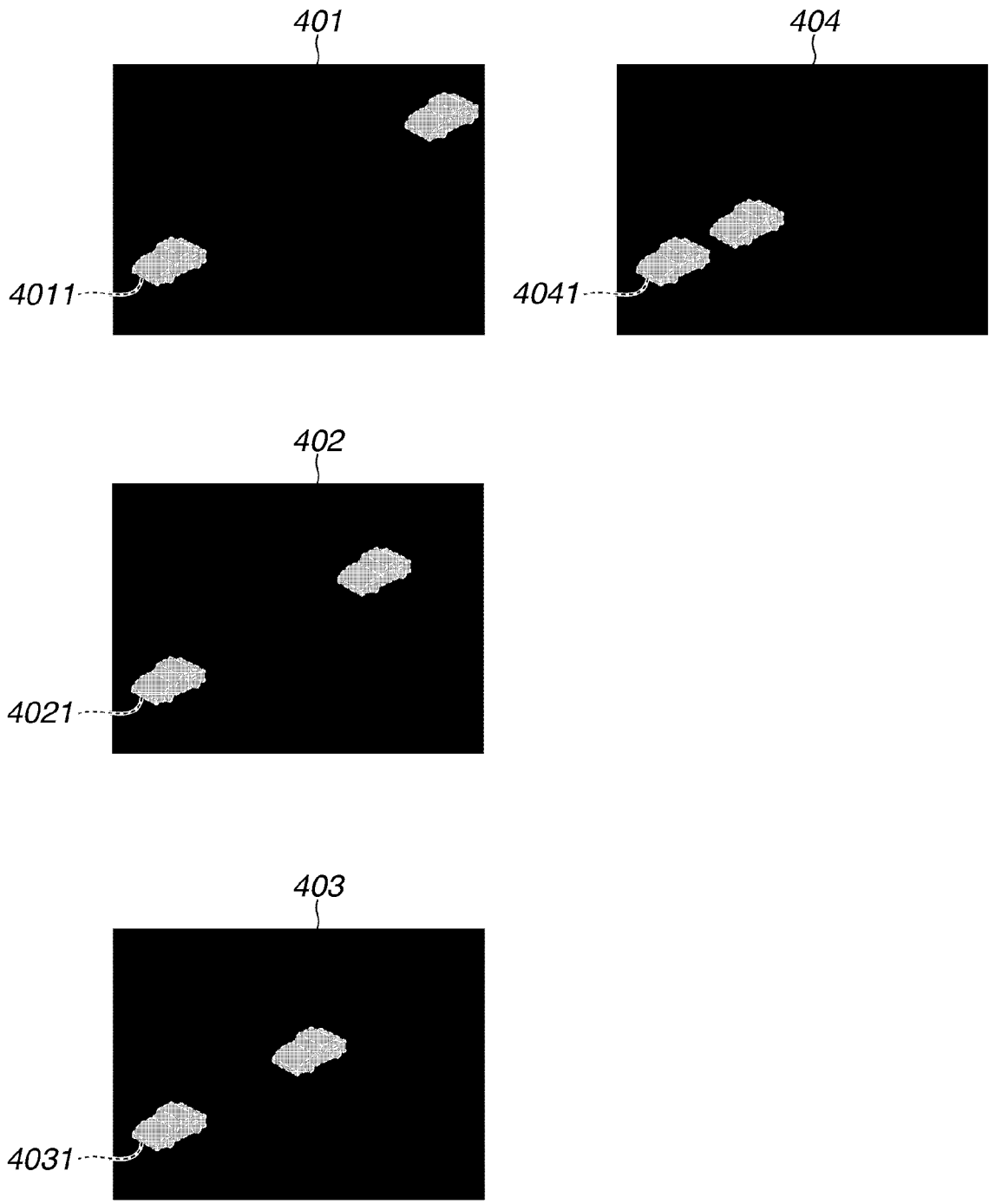
FIG. 4 illustrates difference images indicating differences between a main image and comparative images.

The reason why the object 3015 disappears will be described in more detail below with reference to FIG. 4. FIG. 4 illustrates difference images indicating differences between the main image 305 and the comparative images 301 to 304.

Each difference image can be generated by acquiring a difference in pixel value between pixels at respective corresponding coordinates in the main image 305 and in each of the comparative images 301 to 304. In the example illustrated in FIG. 4, the intensity of difference is represented by the gray scale. A blacker region has a smaller difference from the main image 305. A whiter region has a larger difference from the main image 305. A black region has no difference from the main image 305. A white region has the largest difference from the main image 305. In the example in FIG. 4, each of difference images 401 to 404 is acquired by acquiring a difference between each of the comparative images 301 to 304 (see FIG. 3) and the main image 305, respectively. When determining a difference from the main image 305, the pixel value of a pixel may be any pixel level such as brightness or density. A difference in pixel value between respective corresponding pixels in the main image 305 and in each of the comparative images 301 to 304 indicates the degree of difference. In the following descriptions, the degree of difference is referred to as a difference intensity.

Referring to the difference images in FIG. 4, there exists a difference in a region of the moving object (car) in each of the difference images 401 to 404. In addition, there exists a difference also in a region 3051 of the car in the main image 305, i.e., in each of regions 4011 to 4041.

Referring to the difference images 401 to 404 illustrated in FIG. 4, assuming that a region having a large difference in pixel value from the main image (white region) in each comparative image is a region subjected to combination, the image of the region subjected to combination is combined with the main image. Specifically, regions in the comparative images respectively corresponding to the regions 4011 to 4041 (see FIG. 4) are subjected to combination. Since the image of the background in the comparative images is combined with the main image, the moving object 3015 in the main image 305 disappears.

As described above, in the present exemplary embodiment, combining the main image (out of the plurality of images subjected to combination) and images of the difference regions in the comparative images 301 to 304 (out of the plurality of images subjected to combination) enables combining objects included in the plurality of images through simple processing. However, if images are combined in such a simply way, the object in the main image 305 may disappear.

Therefore, the present exemplary embodiment adds to the combined image the object that has disappeared from the main image 305 after combining the main image 305 and the regions of differences from the main image 305 in the comparative images 301 to 304.

Figure 2:
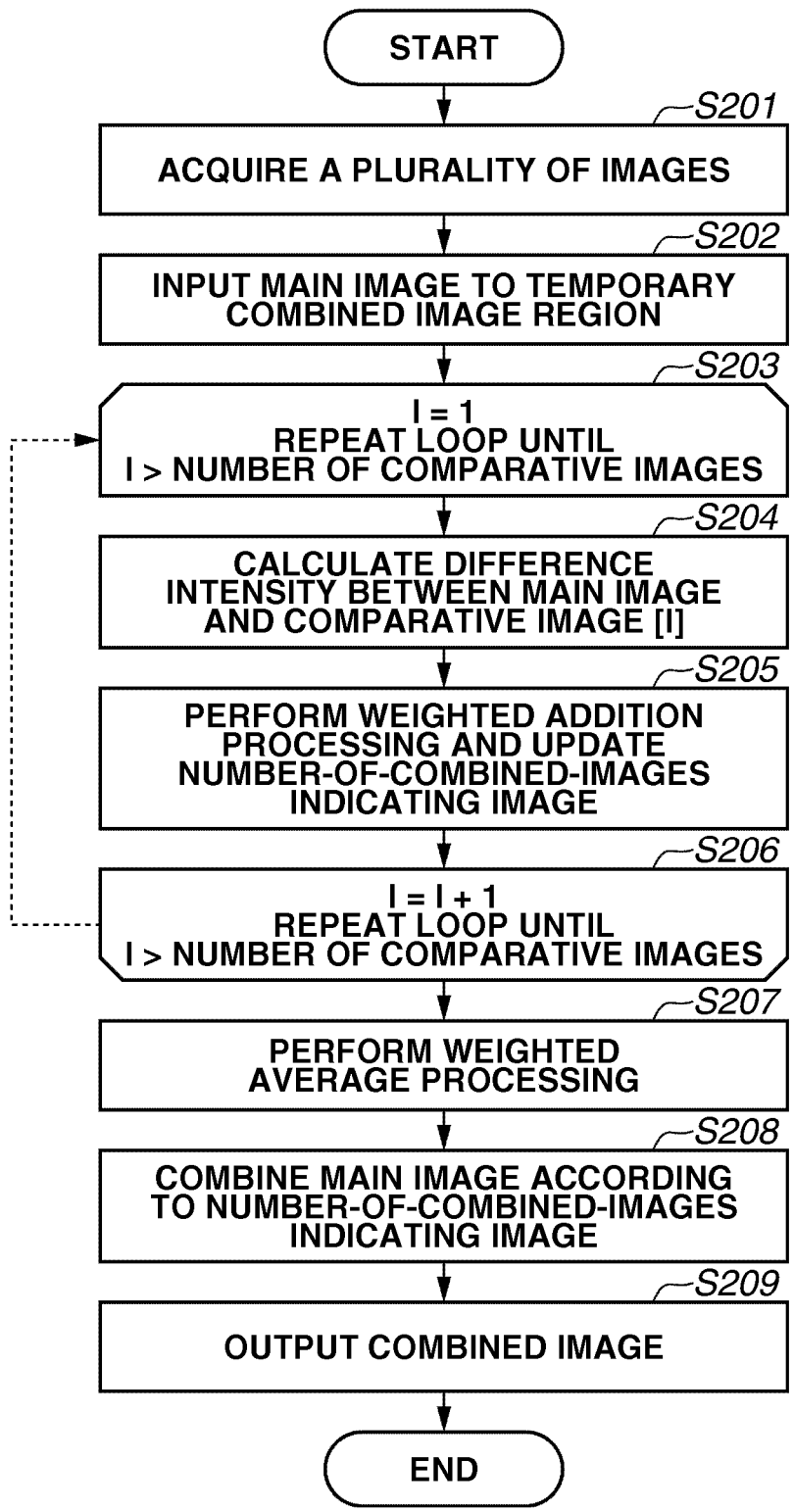
FIG. 2 is a flowchart illustrating processing for combining a plurality of images.

FIG. 2 is a flowchart illustrating processing for combining a plurality of images according to the present exemplary embodiment. The processing illustrated in FIG. 2 is executed by an application which is activated in response to a user instruction. Specifically, the CPU 101 executes a program corresponding to the application stored in the secondary storage device 105 and the ROM 103 to activate the application. Then, the CPU 101 executes a program of the application by using the RAM 104 as a work memory to implement the processing of the flowchart in FIG. 2.

In step S201, the CPU 101 acquires a plurality of images subjected to combination selected in response to a user instruction. In step S201, the CPU 101 acquires images stored in various types of memories such as the ROM 103, the secondary storage device 105, and a USB memory and a memory card connected to the I/O control unit 108, as images subjected to combination. The plurality of images subjected to combination includes frames extracted from a moving image and images continuously captured in continuous shooting by using a digital camera. The plurality of images subjected to combination further includes images of similar subjects captured at long-time intervals, for example, by a fixed-point observation camera and an astronomical camera.

As example processing for acquiring images subjected to combination, the user, when a moving image is reproduced and displayed on a display device, extracts as frames subjected to combination a plurality of frames selected by using an input device while checking the moving image.

In this case, the CPU 101 clips still images from a moving image in the bit map format formed of red, green, and blue (RGB) signals and stores the clipped still images in the RAM 104. Three or more images are desirably acquired.

Data compression may be performed by using a difference between frames depending on the format of moving image data. In this case, the CPU 101 decodes the moving image data to extract still images in the bit map format. Specifically, with the above-described moving image data, the CPU 101 encodes a frame in the moving image and a difference between the relevant frame and frames before and after the relevant frame as information about the relevant frame. When decoding the moving image data, the CPU 101 generates a frame based on difference data between frames and decoded frame. In the present exemplary embodiment, the CPU 101 extracts still images decoded in this way.

When images subjected to combination are acquired in this way in step S201, then in steps S202 to S207, the CPU 101 performs the above-described processing for combining the main image 305 and images of the difference regions in the comparative images 301 to 304. In this case, combination processing from step S202 to step S207 will be referred to as temporary combination.

In step S202, the CPU 101 stores the main image 305 in a temporary combined image region provided in the RAM 104. This temporary combined image region (a buffer provided in the RAM 104) has the same number of vertical pixels, the same number of horizontal pixels, and the same number of channels (three channels R, G, and B) as the main image 305. As described below, the CPU 101 writes images of difference regions in the comparative images 301 to 304 to the temporary combined image region following the main image 305 to combine the main image 305 and images of difference regions in the comparative images 301 to 304. An image stored in the temporary combined image region is referred to as a temporary combined image.

Specifically, in step S202, the CPU 101 replaces pixel values for all pixels in the temporary combined image (Rt(x, y), Gt(x, y), Bt(x, y)) with pixel values for the main image 305 having the same coordinates (Rm(x, y), Gm(x, y), Bm(x, y)).

As described below, in the present exemplary embodiment, when combining the main image 305 and images of the difference regions in the comparative images 301 to 304, the CPU 101 weights a plurality of pixels forming each image and applies the weighted average processing to these pixels. The weight of the main image 305 with respect to all images is "1". Therefore, the CPU 101 assigns "1" to all pixels of a weight sum image Ws(x, y) (see the formula below). The weight sum image is an image of one channel having the same number of vertical pixels and the same number of horizontal pixels as the main image 305. Similar to the temporary combined image, the weight sum image requires a memory having a size that does not cause overflow. In the assignment, the CPU 101 stores the pixel values for the weight sum image in a buffer provided in the RAM 104 for storing the weight sum image. This buffer is referred to as a weight sum imaging region.

As described above, in step S202, the CPU 101 assigns the pixel value for the main image 305 to each of the pixels forming the temporary combined image, and assigns a weight to the weight sum image. Therefore, the CPU 101 executes processing based on the following formulas. A symbol "=" denotes the assignment with which the contents of the right-hand side is stored in the left-hand side. (x, y) indicates coordinates in an image and indicates processing on a pixel basis.

$Rt(x,y)=Rm(x,y)$ $Gt(x,y)=Gm(x,y)$ $Bt(x,y)=Bm(x,y)$ $Ws(x,y)=1$

Specifically, in step S202, the CPU 101 copies the main image 305 to the temporary combined image region, and initializes the weight sum image to "1". The CPU 101 copies the main image 305 to the temporary combined image region so that, when the main image 305 includes a region having similar contents to a comparative image, pixel values of pixels in the region remains pixel values for the main image 305. Such pixels are not subjected to weighted addition (described below) by pixel values for the comparative images 301 to 304, and, therefore, remain in the temporary combined image region, having pixel values for the main image 305. Therefore, when the temporary combined image is output, it can be output as the pixel value for the main image 305.

The reason why the weight sum image is set to "1" is as follows. Sufficiently decreasing the weight for pixels in the main image 305, which have undergone weighted addition by pixel values for the comparative images 301 to 304, enables reducing the effect of pixel values for the main image 305 to zero or an ignorable level with the accuracy of integer calculation.

As another method of combination, the CPU 101 may initialize the temporary combined image and the weight sum image to "0", perform weighted addition, and then combine the main image 305. Pixels having a weight sum image value of "0" after weighted addition are not subjected to weighted addition by the comparative images 301 to 304. Pixels values of these pixels are output as pixel values for the main image 305. For such pixels having a weight sum image value of "0" after weighted addition, the CPU 101 replaces pixel values for the temporary combined image with pixel values for the main image 305 having the same coordinates. In this case, the CPU 101 replaces pixel values for the weight sum image with "1".

Step S203 starts loop processing and step S206 ends it. In the loop processing, the CPU 101 first assigns "1" to a variable I indicating the number of comparative images that have undergone the combination processing. When I becomes greater than the number of comparative images, the processing exits the loop. Comparative images [1] and [2] indicate the first and second comparative images subjected to combination. A comparative image [I] indicates the comparative image for variable [I]. The number of comparative images is equal to the number of the plurality of images acquired in step S201 minus one (the number of the main image 305).

In step S204, the CPU 101 calculates a difference intensity in pixel value between respective corresponding pixels in the main image 305 and in the comparative image [I]. When the main image 305 and comparative image [I] include a region having similar contents, it is desirable to acquire a difference between these regions. Therefore, for example, if images are captured without fixing a camera, the CPU 101 adjusts the positions of the main image 305 and the comparative image [I]. In this position adjustment, for example, the CPU 101 acquires an overall moving vector between these images, and deforms the comparative image [I] according to the acquired moving vector to adjust its view angle with that of the main image 305 so as to align the background positions of the main image 305 and the comparative image [I]. The moving vector can be acquired by using a known technique such as the block matching method. Image deformation can be achieved by using a known technique such as the affine transformation. To simplify descriptions, all of the above-described images are assumed to be clipped from a moving image captured by a fixed camera.

In step S204, the CPU 101 calculates a difference intensity from the pixel of corresponding comparative image [I] for all pixels in the main image 305. As described by the formula below, the CPU 101 acquires a difference intensity D(x, y) based on the distance in the color space between the R, G, and B values of the main image 305 (Rm(x, y), Gm(x, y), Bm(x, y)) and the R, G, and B values of the comparative image [I] (Rs(x, y), Gs(x, y), Bs(x, y)).

$$D(x,y)=\sqrt{(Rm(x,y)-Rs(x,y))^2+(Gm(x,y)-Gs(x,y))^2+(Bm(x,y)-Bs(x,y))^2}$$

The difference intensity D(x, y) indicates a difference in pixel value between respective corresponding pixels in the main image 305 and in the comparative image [I]. x and y indicate the coordinates of a pixel in an image, and ^ indicates exponentiation.

As another example, the sum of absolute values of the differences in R, G, and B values may also be used as a difference intensity. Further, the R, G, and B values are converted into other color spaces such as CIELAB, and a distance in the color space may be used as a difference intensity.

The CPU 101 stores the difference intensity D(x, y) acquired in this way in a difference intensity image region (a buffer provided in the RAM 104). An image stored in the difference intensity image region is referred to as a difference intensity image. A difference intensity image has the same number of vertical pixels and the same number of horizontal pixels as the main image 305. A region corresponding to each pixel in the difference intensity image region has such a size for storing a maximum difference intensity without an overflow. When storing D(x, y) in the difference intensity image region, the CPU 101 assigns D(x, y) corresponding to all pixels in the main image 305 and the comparative images 301 to 304.

When the CPU 101 acquires a difference intensity from the comparative images 301 to 304 for all pixels in the main image 305, the processing proceeds to step S205. In step S205, the CPU 101 performs the weighted addition processing based on the difference intensity acquired in step S204.

The CPU 101 determines whether the weighted addition processing is to be applied to each pixel in the comparative image [I]. In the weighted addition processing, the CPU 101 first determines a threshold value for each pixel in the difference intensity image and applies weighted addition to pixels having a difference intensity exceeding the threshold value (and does not apply weighted addition to pixels having a difference intensity not exceeding the threshold value). This aims at preventing the processing from being affected by effects of noise in images, such as delicate change in brightness and camera sensor noise. The threshold value may be a predetermined numerical value or a numerical value acquired by a known technique such as binarization processing.

For pixels having a difference intensity exceeding the threshold value, the CPU 101 multiplies the pixel values for the comparative image [I] (Rs(x, y), Gs(x, y), Bs(x, y)) by a weight W(x, y), and adds the resultant values to pixel values of pixels having the same coordinates in the temporary combined image (Rt(x, y), Gt(x, y), Bt(x, y)). The weight W(x, y) is the value of the difference intensity. The weighted addition can be represented by the following formulas:

$$W(x,y)=D(x,y)$$

$$Rt(x,y)=Rt(x,y)+Rs(x,y)\times W(x,y)$$

$$Gt(x,y)=Gt(x,y)+Gs(x,y)\times W(x,y)$$

$$Bt(x,y)=Bt(x,y)+Bs(x,y)\times W(x,y)$$

The weight W(x, y) is the value of the difference intensity. Therefore, with pixels of regions having largely different contents in the main image 305 and the comparative images 301 to 304, the above-described weight is large because of a large difference, and pixel values for the comparative images 301 to 304 are greatly reflected. Although the weight W(x, y) is the value of the difference intensity, it may be a difference intensity multiplied by a coefficient, or a value normalized to "0" to "255" between the threshold value and the maximum difference intensity.

As described above, if the pixel value (x, y) of the difference intensity image does not exceed the threshold value, the weighted addition processing is not performed and, therefore, "0" is assigned to W(x, y).

In step S205, the CPU 101 updates the number-of-combined-images indicating image. The number-of-combined-images indicating image indicates the number of combined comparative images for each pixel in the temporary combined image. Specifically, it indicates the number of combinations with the comparative images applied to each pixel in the temporary combined image. The number-of-combined-images indicating image is a buffer provided in the RAM 104, and has the same number of vertical pixels and the same number of horizontal pixels as the main image 305. The number-of-combined-images indicating image is initialized to "0" in advance. Only when the pixel value (x, y) of the difference intensity image exceeds the above-described threshold value, the CPU 101 adds "1" to the same coordinates Ws(x, y) of the number-of-combined-images indicating image (refer to the following formula).

$$Ws(x,y)=Ws(x,y)+1$$

The CPU 101 applies such processing to all pixels to store the number of comparative images subjected to temporary combination.

Although the CPU 101 performs the weighted addition processing in step S205 by using the difference intensity acquired in step S204, the CPU 101 may perform the temporary image processing in step S205 by using a difference intensity image that has undergone the blurring processing. This processing aims at preventing an uncomfortable feeling from arising because of level differences occurring at boundaries of the combined image.

Step S206 ends the loop processing. When the loop processing has not yet been completed for all comparative images, the processing returns to step S204. When the loop processing has been completed for all of the comparative images 301 to 304, the processing proceeds to step S207.

In step S207, the CP 101 performs the weighted average processing. In the weighted average processing, the CPU 101 divides pixel values for the temporary combined image by pixel values for the weight sum image, and replaces pixel values for the temporary combined image with the resultant value (refer to the following formulas, where "/" denotes division).

$$Rt(x,y)=Rt(x,y)/Ws(x,y)$$

$$Gt(x,y)=Gt(x,y)/Ws(x,y)$$

$$Bt(x,y)=Bt(x,y)/Ws(x,y)$$

The resultant image may be stored in a separate buffer for storing an image that has undergone the weighted average processing. The processing in up to step S207 completes the temporary combination processing. Thus, in each comparative image, the CPU 101 does not apply the combination processing to a region having similar contents to the main image 305 where the weight becomes "0", and applies the combination processing to a region having different contents from the main image 305 where a larger difference provides a larger weight.

In the temporary combined image region, the above-described processing in steps S201 to S207 enables combining the main image 305 and images of regions having a difference from the main image 305 exceeding the threshold value in the comparative images 301 to 304.

As described above, the temporary combined image region stores pixel values for the main image 305 and the comparative images 301 to 304 multiplied by the weight, for the number of images subjected to combination. This means that a memory size for storing this data without an overflow is required.

FIG. 5 illustrates a resultant combined image produced after the temporary combination. The objects (cars) in the comparative images 301 to 304 are combined with the main image 305. The object (car) in the main image 305 does not exist in a broken-line portion 501 because of the following reason. As illustrated in the images 401 to 404 (see FIG. 4), there exists a difference intensity in the object regions 4011 to 4041 in the main image 305, and non-object portions (background) in the comparative images 301 to 304 are combined in step S205. If this image is recognized as an output result, the object 3015 in the main image 305 does not exist although the user selects the main image 305 as an image subjected to combination.

Figure 6:
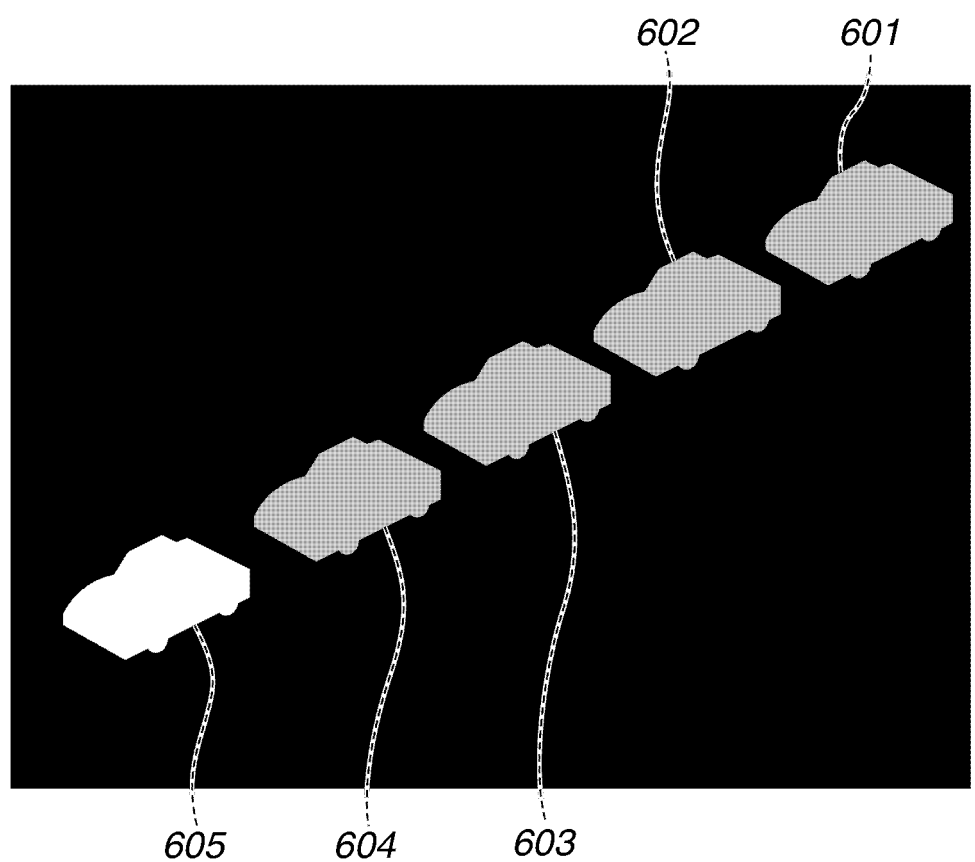
FIG. 6 illustrates a number-of-combined-images indicating image.

FIG. 6 illustrates the above-described number-of-combined-images indicating image. As data indicating the number of comparative images subjected to combination, the CPU 101 stores the number-of-combined-images indicating image in the RAM 104 for each pixel in the temporary combined image. However, since the number-of-combined-images indicating image indicates the number of combinations corresponding to each pixel in the temporary combined image, the number-of-combined-images indicating image may not be displayed. Referring to FIG. 6, the number-of-combined-images indicating image is visualized for descriptions.

Referring to the number-of-combined-images indicating image illustrated in FIG. 6, a black region is a portion where the weighted addition has been applied to none of the comparative images 301 to 304, and a white region is a portion where the weighted addition has been applied to all of the comparative images 301 to 304. Halftone (gray) portions are portions where the weighted addition has been applied to some of the comparative images 301 to 304. The weighted addition has been applied to a more number of comparative images in a blacker region, and to a less number of comparative images in a whiter region.

Each of regions 601 to 604 is a region having different contents from one of the comparative images 301 to 304. Therefore, each of the regions 601 to 604 has undergone the weighted addition once, and is colored in gray.

On the other hand, a region 605 is a region having different contents from all of the comparative images 301 to 304. Therefore, the difference intensity exceeds the threshold value for all of the comparative images 301 to 304, and weighted addition is applied to all of the comparative images 301 to 304. Thus, a region with which weighted addition is applied to all of the comparative images 301 to 304 has a large difference from all of the comparative images 301 to 304. Such a region therefore is highly likely to include the object in the main image 305.

In step S208 (see FIG. 2), the CPU 101 combines the main image 305 according to the value of the number-of-combined-images indicating image. Specifically, in the temporary combined image, a region having a large value of the number-of-combined-images indicating image can be assumed to be a region corresponding to the object in the main image 305, similar to the white region (see FIG. 6). Then, in the temporary combined image, the CPU 101 overwrites the pixel value for the main image 305 onto pixels having a large value of the number-of-combined-images indicating image to combine the main image 305. In other words, in the temporary combined image, the CPU 101 identifies a region having a large value of the number-of-combined-images indicating image and then determines the region in the main image 305 corresponding to the identified region as a region subjected to combination. Then, the CPU 101 combines the temporary combined image and the image of the region subjected to combination in the main image 305.

Thus, when combining the main image 305 and the temporary combined image, the CPU 101 acquires the rate of combination of the main image 305 (Wm(x, y)) and then performs combination based on the rate. To acquire the rate, the CPU 101 uses a function for normalizing the number-of-combined-images indicating image.

Figure 7:
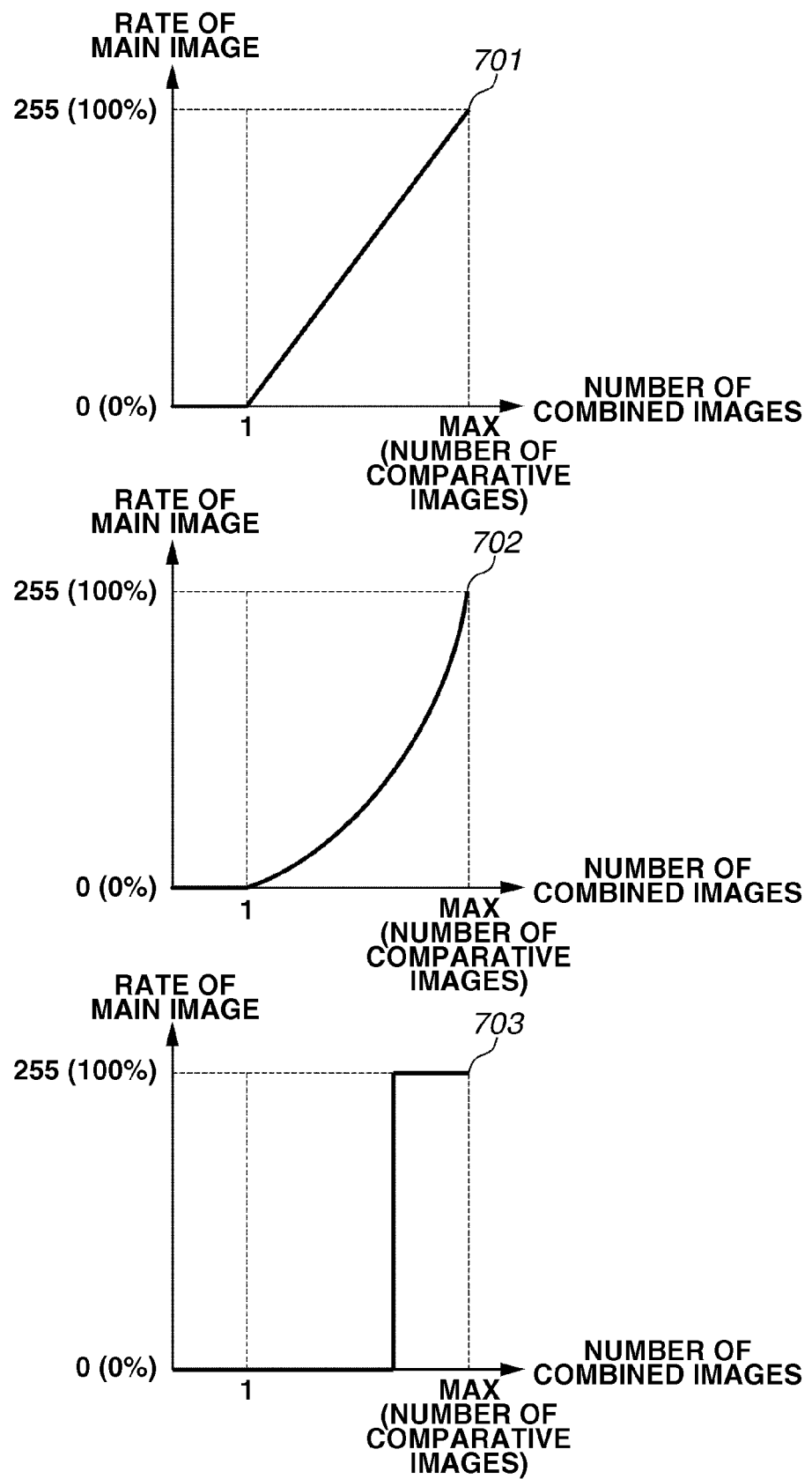
FIG. 7 illustrates relations between the number of combined images and the rate of the main image in graph form.

FIG. 7 illustrates relations between the number of combined images and the rate of the main image 305, i.e., graphs of example characteristics of a normalization function. The horizontal axis of each graph is assigned an input of the function, i.e., the pixel value for the number-of-combined-images indicating image. The vertical axis is assigned an output of the function, i.e., the value ("0" to "255") of the rate of combination of the main image 305 (Wm(x, y)). A function 701 gives an output value of "0" when the number of combined images is "1" or less, and a non-zero output value when the number of combined images exceeds "1". Referring to FIG. 6, each of the regions 601 to 604 relevant to the number of combined images of "1" gives an output value of "0". The region 605 having the maximum number of combined images (equals the number of comparative images), i.e., the object region in the main image 305, gives a maximum output of "255". Therefore, since the combination of the main image 305 is not applied to the regions 601 to 604, objects in the regions 601 to 604 in the temporary combined image are not affected.

Other functions 702 and 703 have different input and output relations. The function may be based on a formula or on a dynamically generated or prestored look-up table (LUT).

Blur may be produced in the number-of-combined-images indicating image by using a known technique such as the Gaussian filter, and the function may input the number-of-combined-images indicating image. This technique produces neither noise effects nor unnatural boundary lines in the resultant combined image. The generation of a blurred number-of-combined-images indicating image requires calculations at least with the accuracy of integer calculation such as decimal-point calculation and normalization processing.

In step S208, based on the rate of combination of the main image 305, the CPU 101 combines the main image 305 and the temporary combined image after the weighted averaging processing (step S207) and then stores the resultant combined image in the resultant combined image region provided in the RAM 104. The resultant combined image region (a buffer provided in the RAM 104) is an image having the same number of vertical pixels, the same number of horizontal pixels, and the same number of channels as the main image 305. When the R, G, and B values of pixels in the resultant combined image are represented by Rr(x, y), Gr(x, y), and Br(x, y), respectively, the CPU acquires the resultant combined image according to the following formulas:

$$Rr(x,y)=(Rm(x,y)\times Wm(x,y)+Rt(x,y)\times(255-Wm(x,y)))/255$$

$$Gr(x,y)=(Gm(x,y)\times Wm(x,y)+Gt(x,y)\times(255-Wm(x,y)))/255$$

$$Br(x,y)=(Bm(x,y)\times Wm(x,y)+Bt(x,y)\times(255-Wm(x,y)))/255$$

Figure 8:
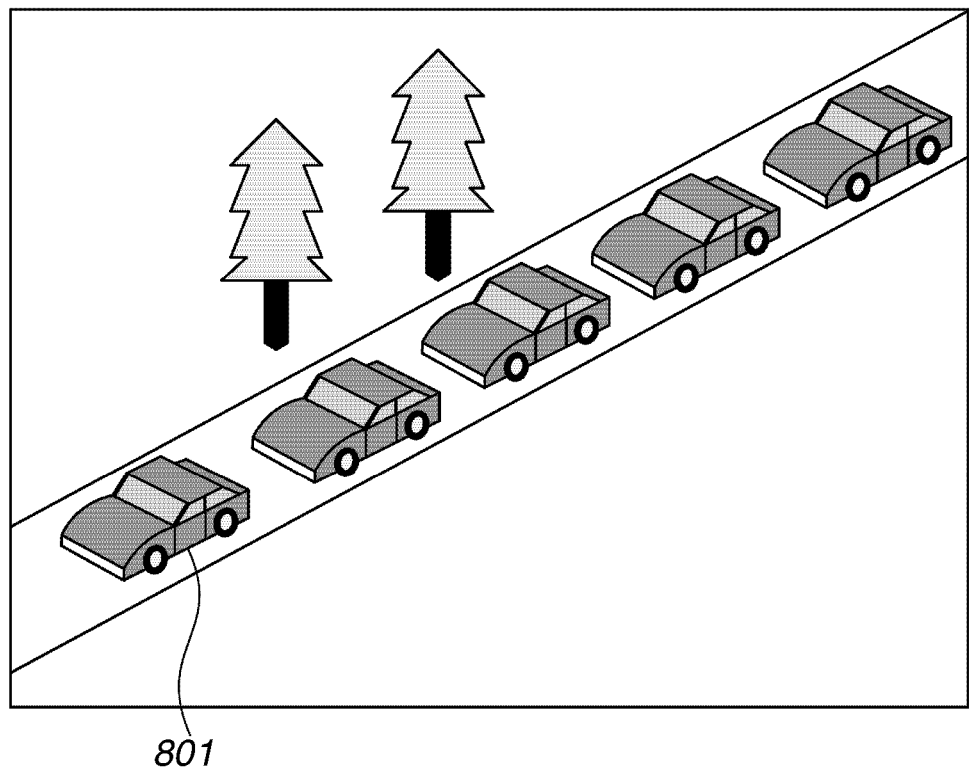
FIG. 8 illustrates a resultant combined image.

When the CPU 101 applies the combination of the main image 305 to all pixels in the temporary combined image according to the above-described formulas, the main image 305 is combined with a region relevant to a large number of combined images of the comparative images 301 to 304 in the temporary combined image. FIG. 8 illustrates the result combined image produced by this combination processing.

As illustrated in FIG. 8, an object 801 exists in the resultant combined image. The object 801 is the object in the main image 305 which once disappeared from the temporary combined image as a result of combining the comparative images 301 to 304 (step S207).

In step S209, the CPU 101 outputs the resultant combined image acquired in step S208. As example output forms, the CPU 101 may instruct the display control unit 106 to display the resultant combined image on the display device 107, or instruct the I/O control unit 108 to transmit the resultant combined image to the output device 110 to enable printing on a print sheet. Further, the CPU 101 may store the resultant combined image in the secondary storage (HDD) 105 as a file, or transmit the resultant combined image to the outside of the image processing apparatus via a network (not illustrated).

The following describes example combination processing according the present exemplary embodiment by using an image group different from the image group (see FIG. 3) as a plurality of images subjected to combination. FIG. 9 illustrates a plurality of images subjected to combination acquired in step S201. In addition to the plurality of frames illustrated in FIG. 3, frames between the plurality of frames in a moving image are also extracted.

Figure 12:
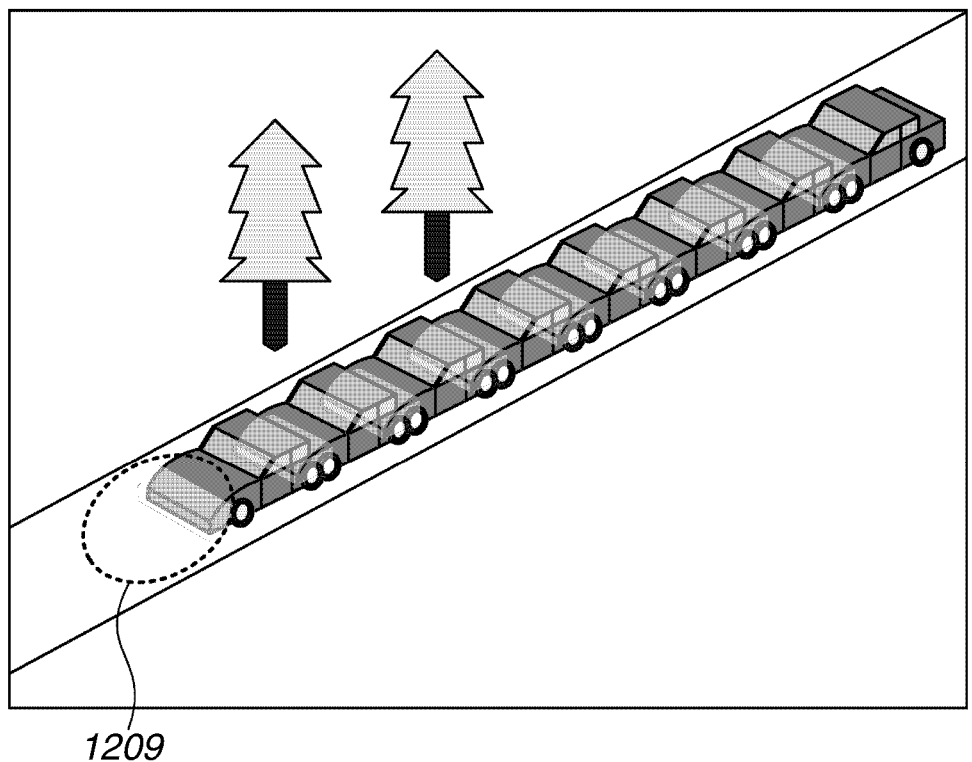
FIG. 12 illustrates a resultant combined image produced by combining the main image and images of difference regions in the comparative images.

The plurality of images subjected to combination illustrated in FIG. 9 includes a main image 909 and comparative images 901 to 908. FIG. 12 illustrates an image acquired after the CPU 101 inputs the image group illustrated in FIG. 9 and applies the processing in steps S202 to S207 (temporary combination) to the image group. Similar to the object indicated by the broken-line portion 501 (see FIG. 5), an object (car) in the main image 909 does not exist in a broken-line portion 1209 because of the following reason. As described above, there exists a difference intensity between the main image 909 and the comparative images 901 to 908 in the object region in the main image 909, and, therefore, non-object portions (background) in the comparative images 901 to 908 are combined in step S205.

The object in the main image 909 once disappears similar to the object indicated by the broken-line portion 1209 (see FIG. 12) in processing in up to step S207. However, after the object undergoes the processing in step S208, it is combined in the resultant combined image.

Figure 10:
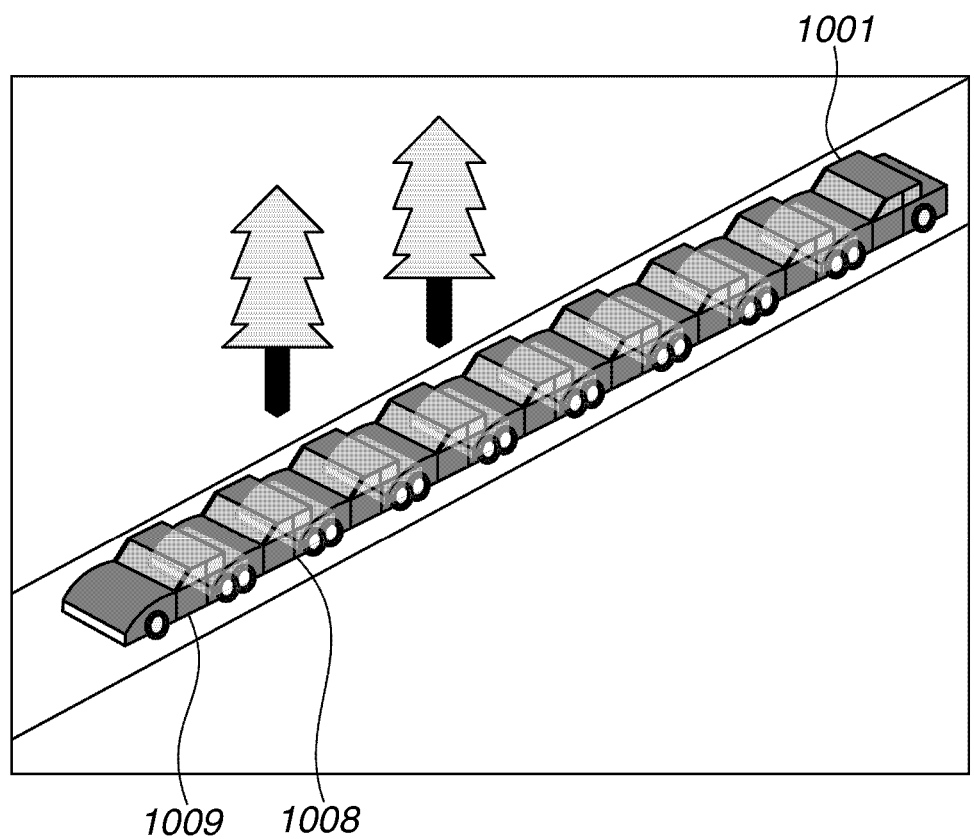
FIG. 10 illustrates a resultant combined image.

FIG. 10 illustrates the resultant combined image in this case. Referring to FIG. 10, the object which once disappeared in temporary combination appears again as an object 1009. Thus, the present technique enables recovering the object in the main image 909 which once disappeared during combination processing.

The object 1009 in the main image 909 has clearer overlapped portions than objects 1008 in the comparative images 901 to 908, because the object in the main image 909 is combined later based on the number of combined images in step S208. Thus, the main image 909 seems to be relatively distinct. Referring to FIG. 10, since the temporally last image 909 in a moving image is used as the main image, the object included in the main image 909 can be seen clearly. This enables the user to suitably check the object included in the temporally last frame 909 in the moving image, and to grasp the movement of the object.

Further, one of effects of clarifying in the resultant combined image the object included in the last frame in the moving image is an image sticking effect. For example, in painting, animation, computer graphics, etc., comparatively clearly displaying the temporally last object while blurring preceding objects enables expressing a movement track and an image sticking of the object.

Figure 11:
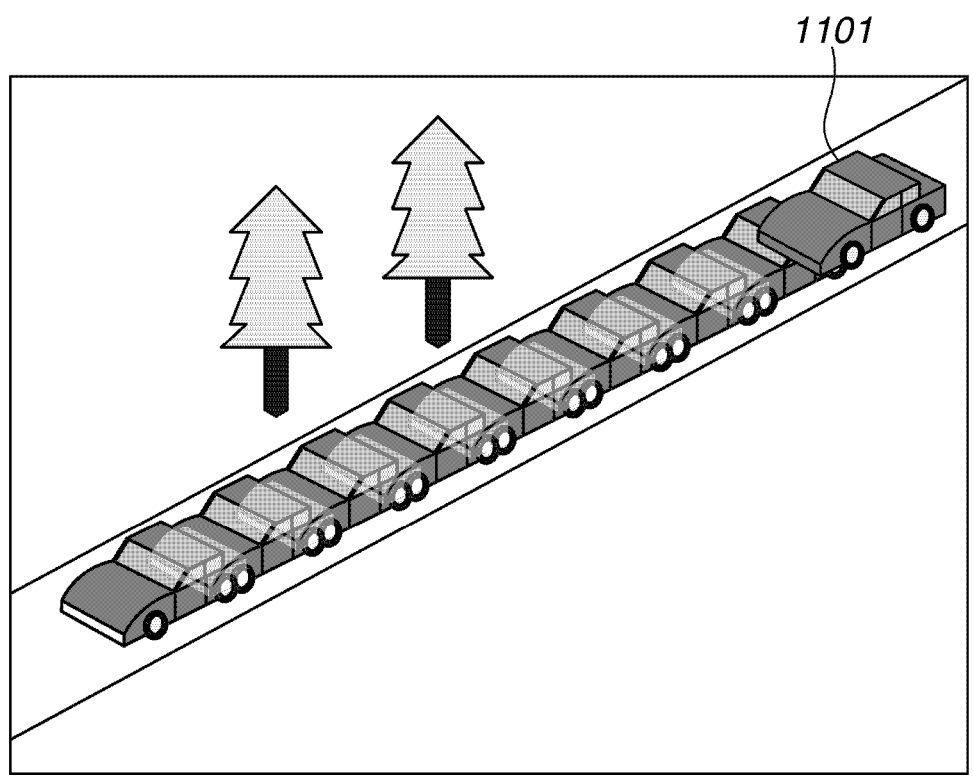
FIG. 11 illustrates a result of applying combination processing to the images in FIG. 9.

As another example selection of the main image 909, FIG. 11 illustrates a result of combination processing by using a temporally first image 901 in the moving image as the main image 909, instead of using the temporally last image 909 as the main image 909. An object 1101 in the main image 909 has clearer overlapped portions than the objects 1008 in the comparative images 901 to 908. In this case, the user can check an object included in the first frame and then grasp a movement track of the object.

According to the above-described exemplary embodiments, in steps S202 to S207 (see FIG. 2), the CPU 101 acquires a difference between each of comparative images and a main image, and combines the main image and an image of a region in each of the comparative images, having a large difference in pixel value from the main image. In step S208 (see FIG. 2), the CPU 101 combines the main image and a region relevant to a large number of comparative images that have undergone the combination.

Thus, the object that once disappeared from the main image can be combined with the temporary combined image acquired in the combination processing in steps S202 to S207. Therefore, objects in images subjected to combination (the main image and comparative images) selected by the user can be suitably combined.

In the present exemplary embodiment, as described above, the CPU 101 combines one main image 909 (out of the plurality of images subjected to combination) and the comparative images 901 to 908 (out of the images subjected to combination) other than the main image 909. Therefore, suitable combination can be performed even without generating a background image not including a moving object in the plurality of images subjected to combination.

Therefore, objects included in a plurality of images can be combined into one image through simple processing.

Although, in the above-described exemplary embodiments, the CPU 101 checks whether combination with the main image is completed for all of comparative images to generate a number-of-combined-images indicating image, the CPU 101 may perform such a check only for some of the comparative images to improve the processing speed. In this case, it is necessary to assign MAX on the horizontal axis of the graphs illustrated in FIG. 7 to the number of comparative images from the number-of-combined-images indicating image is generated, not the number of comparative images.

In the above-described exemplary embodiments, the CPU 101 calculates a difference intensity for all pixels in the comparative images in step S204, and performs the weighted addition processing for each image and updates the number-of-combined-images indicating image in step S205. However, the CPU 101 may sequentially perform the processing in steps S204 and S205 on a pixel basis. Specifically, the CPU 101 may sequentially calculate a difference intensity, apply the weighted addition processing, and update the number-of-combined-images indicating image on a pixel basis. In this case, upon completion of processing for one pixel, the CPU 101 proceeds to the processing for the following pixel.

Although, in the above-mentioned exemplary embodiments, the CPU 101 generates a number-of-combined-images indicating image and specifies an object region in the main image as an object subjected to combination, the object region in the main image 909 may be calculated with other methods. For example, the CPU 101 acquires a moving vector from the comparative images to the main image and then determines that a position pointed to by the moving vector is an object region in the main image. In the case of a plurality of still images clipped from a moving image having a format involving compression including a moving vector, the moving vector may be used. Then, the CPU 101 combines the temporary combined image and the image of the object region in the main image identified based on the moving vector.

In this case, when the number of comparative images combined with the main image exceeds a predetermined threshold value, the CPU 101 may combine the temporary combined image and the region subjected to combination in the main image identified by the moving vector.

In the above-described exemplary embodiments, the CPU 101 generates a temporary combined image as illustrated in FIG. 5 (steps S202 to S207) and then combines the object in the main image (reference image) and the temporary combined image (step S208) to generate the resultant combined image (see FIG. 8). However, the processing is not limited thereto. The resultant combined image illustrated in FIG. 8 may be generated without generating a temporary combined image. Specifically, when differences between the reference image and the comparative images are calculated, the CPU 101 specifies a portion corresponding to a background region (like the one indicated by the broken-line portion 501 (see in FIG. 5)) in the comparative images. Then, the CPU 101 prevents that portion from being combined with the reference image.

For example, in step S204, the CPU calculates a difference intensity from the comparative images and compares the difference intensity with a threshold value, for each pixel in the reference image. In step S205, for pixels in the reference image which have not yet undergone combination, with which the difference intensity from the comparative images is determined to be equal to or greater than a threshold value, the CPU 101 accumulates difference data in memory and updates the number of comparative images. After completion of the loop processing in steps S203 to S206 for all of the comparative images, the CPU 101 can calculate the number of comparative images with which the difference intensity from the comparative images is determined to be equal to or greater than the threshold value, for each pixel in the reference image. When a pixel is relevant to a large number of such comparative images, the relevant pixel is determined to be a difference for many comparative images. Therefore, the CPU 101 determines that the pixel is included in a region corresponding to the object in the reference image. For example, the region 605 (see FIG. 6) is such a region.

When the loop processing in steps S203 to S206 is completed, the CPU 101 determines that pixels relevant to the number of the above-described comparative images equal to or greater than a predetermined number (for example, 2) are included in the object region in the reference image. In this case, difference data between the reference image and the plurality of comparative images is accumulated in memory.

In step S208, the CPU 101 combines the reference image and the difference data accumulated in memory. The CPU 101 restricts the combination of the difference data for the object region in the reference image, for example, by preventing the difference data from being combined with pixels in the object region in the reference image. Thus, an object like the one indicated by the broken-line portion 501 in the reference image will not be combined. Therefore, even if the object included in the reference image is a difference from the comparative images, the CPU 101 excludes the relevant object region from the combination processing, thus preventing the object in the reference image from disappearing as illustrates in FIG. 5.

Since the CPU 101 combines pixels in the reference image relevant to the number of comparative images less than the predetermined number, the CPU 101 combines the difference data for pixels corresponding to the regions 601 to 604 (see FIG. 6). Thus, objects included in the comparative images can be suitably combined with the reference image.

Through the above-described processing, even if the generation of a temporary combined image and the combination of the temporary combined image with the object in the reference image are not performed, only objects in the difference regions between the reference image and the comparative images are combined with the reference image, and the background is not combined therewith. Thus, the resultant combined image illustrated in FIG. 8 can be acquired.

The scope of the above-described exemplary embodiments further includes methods of storing on a storage medium a program for operating the components of the above-described exemplary embodiments, reading as a code the program stored in the storage medium, and causing a computer to execute the program to implement the functions of the above-described exemplary embodiments.

The storage medium is a computer-readable storage medium. The scope of the above-described exemplary embodiments further includes the program itself as well as the storage medium storing the program. The storage medium may be any one of, for example, a floppy disk, a hard disk, an optical disc, a magneto-optical disk, a compact disc read-only memory (CD-ROM), a magnetic tape, a nonvolatile memory card, and a ROM.

The scope of the above-described exemplary embodiments further includes not only the stand-alone program stored in the storage medium but also programs operating on an OS in collaboration with functions of other software and expansion boards to implement the operations of the above-described exemplary embodiments.

The present exemplary embodiment can be achieved not only by one processor executing a program but also by a plurality of processors executing processing in a collaborative way.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-161435 filed Jul. 23, 2011, which is hereby incorporated by reference herein in its entirety.

What is claimed is:

1. An image processing apparatus for combining objects included in a plurality of images into one image, the image processing apparatus comprising:

a specification unit configured to, based on a reference image out of a plurality of images and a plurality of comparative images out of the plurality of images, specify a difference region in each of the plurality of comparative images, the difference region including an object subjected to combination and corresponding to a difference from the reference image;

a determination unit configured to, based on a plurality of difference regions specified in the plurality of comparative images by the specification unit, determine an object region corresponding to an object included in the reference image; and a combination unit configured to, based on the object region in the reference image determined by the determination unit and the plurality of difference regions in the plurality of comparative images, combine, with the reference image, the objects subjected to combination included in the plurality of difference regions so that the object corresponding to the object region is included in the reference image with which the plurality of difference regions are combined.

2. The image processing apparatus according to claim 1, further comprising an extraction unit configured to, based on the object region in the reference image determined by the determination unit, extract the object corresponding to the object region from the reference image, wherein the combination unit is configured to combine, with the reference image, images of difference regions in the plurality of comparative images, and further to combine, with the reference image, the object extracted by the extraction unit at a position corresponding to the object region in the combined image acquired by the combination.

3. The image processing apparatus according to claim 2, wherein the combination unit is configured to combine, with the reference image, the object extracted by the extraction unit weighted by a weight based on the plurality of difference regions in the plurality of comparative images.

4. The image processing apparatus according to claim 1, wherein the combination unit is configured to combine, with the reference image, images of the difference regions so as to restrict the combination of the object region in the reference image and images of the difference regions in the comparative images.

5. The image processing apparatus according to claim 1, wherein the determination unit is configured to, based on positions of the difference regions in the plurality of comparative images, determine the object region corresponding to the object included in the reference image.

6. The image processing apparatus according to claim 5, wherein the determination unit is configured to determine, based on a number of times coordinates for the plurality of comparative images are specified as the difference regions by the specification unit, the object region corresponding to the object included in the reference image.

7. The image processing apparatus according to claim 1, further comprising an output unit output a combined image obtained by the combining by the combination unit.

8. The image processing apparatus according to claim 7, wherein the output unit causes a display apparatus to display the combined image.

9. The image processing apparatus according to claim 7, wherein the output unit causes a printing apparatus to print the combined image.

10. The image processing apparatus according to claim 1, wherein the plurality of images are frames included in a moving image.

11. The image processing apparatus according to claim 10, wherein the plurality of images are frames selected from the moving image in accordance with an instruction by a user.

12. The image processing apparatus according to claim 10, wherein the reference image is a last frame out of the frames in the moving image.

13. An image processing method, executed by at least one processor, for combining objects included in a plurality of images into one image, the image processing method comprising:

specifying, based on a reference image out of a plurality of images and a plurality of comparative images out of the plurality of images, a difference region, in each of the plurality of comparative images, the difference region including an object subjected to combination corresponding to a difference from the reference image;

determining, based on a plurality of difference regions specified in the plurality of comparative images, an object region corresponding to an object included in the reference image; and combining, based on the determined object region in the reference image and the plurality of difference regions in the plurality of comparative images, with the reference image, the objects subjected to combination included in the plurality of difference regions so that the object corresponding to the object region is included in the reference image with which the plurality of difference regions are combined.

14. A non-transitory computer-readable storage medium storing a program that causes a computer to execute the image processing method according to claim 13.

* * * * *